Patented Oct. 2, 1945

2,386,026

UNITED STATES PATENT OFFICE 2,386,026

THIO-BARBITURATES

Charles O. Wilson, St. Paul, Minn., and James H. Boothe, Pearl River, N. Y., assignors to Regents of the University of Minnesota, Minneapolis, Minn., a corporation of Minnesota No Drawing. Application September 18, 1943, Serial No. 502,974

19 Claims. (Cl. 260—260)

This invention relates to new pharmacologically active compounds having depressant and hypnotic properties and capable of exerting such effects rapidly and over a short period of time. More particularly the invention relates to the 5,5-dialkyl-4-thiobarbiturates, to the 5,5-dialkyl-2,4- (and -4,6-) dithiobarbiturates, the 5,5-dialkyl-2,4,6-trithiobarbiturates and salts thereof, and to processes of making such compounds. It is an object of the invention to provide such compounds and processes.

In carrying out the invention there is utilized as a starting material a 5,5-di-substituted-4-imino (or -4,6-di-imino) barbituric acid or a 5,5-di-substituted-4-imino - 2 - thiobarbituric acid wherein the substituents in the 5 position are either the same or different and each is further characterized by being hydrogen, a short chain primary, iso alkyl, branched chain alkyl or alkenyl group containing not more than 6 carbon atoms, an aryl group, a cycloalkane group or a cycloalkene group. Thus, for example, the substituent in the 5,5-position of the starting material may be ethyl, isopropyl, 1-methyl butyl, n-butyl, isoamyl (pentyl) or the like, allyl, isopropenyl, benzyl, phenyl or substituted phenyl, cyclohexenyl-1 or cyclopentyl. The selected barbituric acid or 2-thiobarbituric acid starting material is then reacted with hydrogen sulphide. For carrying out the reaction, the hydrogen sulphide is preferably dissolved in a solvent, such as ethyl alcohol, aniline, pyridine, isopropyl alcohol, benzene, toluene, dioxane or the like. A convenient and desirable method is to saturate the solvent with the hydrogen sulphide at room temperature and under pressure of about 10–20 pounds per square inch. By shaking the solvent during the time that the hydrogen sulphide is applied thereto, the solution of the hydrogen sulphide is facilitated.

It is also preferable to use a substantially dry solvent in as much as the presence of water in the solvent tends to slow down the subsequent reaction of the hydrogen sulphide with the barbituric acid or the 2-thiobarbituric acid. The amount of solution of hydrogen sulphide used, as compared to the amount of barbituric acid or 2-thiobarbituric, is sufficient to present a stoichiometric excess of sulphur, based upon the amount of barbituric acid or 2-thiobarbituric acid used.

The reaction of the barbituric acid or 2-thiobarbituric acid with the solution of hydrogen sulphide is preferably carried out in a bomb under pressure, at an elevated temperature in excess of 120° C., a practical and preferred range being 140–150° C. The reaction is permitted to continue for 6–24 hours, preferably about 12 hours, after which the reaction vessel is opened and the solvent and excess hydrogen sulphide are evaporated off. In the case of aniline or pyridine as solvents, heating for 30–48 hours is necessary.

The resultant 4-thio, 2,4-dithiobarbituric or 2,4,6-trithiobarbituric acid (depending upon the starting material used) may be purified by crystallization from a mixture of alcohol and water, but greater purity is obtained by dissolving the residue (after evaporation of the solvent and hydrogen sulphide) in water containing a slight stoichiometric excess of sodium hydroxide based upon the amount of product formed, 1–3% solution of sodium hydroxide being desirable. After filtering to remove undissolved material, the resultant 4-thiobarbituric acid or 2,4-dithiobarbituric acid is recovered by acidifying the sodium hydroxide solution, preferably with hydrochloric acid. The product may be further purified by thoroughly washing with a solution of 10% hydrochloric acid to remove any unreacted starting material, and by finally dissolving and crystallizing from a alcohol-water mixture after filtering such mixture through activated charcoal.

Reference is made to the following examples which further illustrate the invention. However, these examples should not be considered as limiting the invention.

EXAMPLE 1

*Preparation of 5,5-diethyl-4-thiobarbituric acid*

1200 cc. of commercial absolute ethyl alcohol were saturated with hydrogen sulphide gas by placing the alcohol in a two-liter container, having a glass tube reaching to within two centimeters of the bottom of the container. The hydrogen sulphide was slowly bubbled through the alcohol and the pressure was allowed to rise to about 10 pounds per square inch. During the period the hydrogen sulphide was being dissolved in the alcohol, the container was shaken intermittently from time to time.

To the 1200 cc. of alcoholic solution of hydrogen sulphide so prepared, there were added 10 grams of 5,5-diethyl-4-imino barbituric acid, and the mixture was sealed in a bomb. The bomb was placed in an oil bath and the latter heated to 140–150° C. for 12 hours. After 12 hours of heating, the bomb was cooled and opened. The solution was filtered and the alcohol and excess hydrogen sulphide were evaporated off under the hood and the yellow residue was dissolved in 200 cc. of water containing five gm. of sodium hydroxide. The solution was filtered and the product was precipitated by acidifying the filtrate with hydrochloric acid. The product was collected on a Buchner funnel, stirred with about 200 cc. of 10% hydrochloric acid to remove any unreacted imino compound, collected and washed again on the filter. The compound was crystallized from a mixture of alcohol and water using activated charcoal in the first crystallization. Subsequent crystallizations were continued until the melting point remained constant. The compound crystallized in lemon-yellow, rectangular platelets.

Yield, 5.0 gm. (45.8%) after one crystallization; M. P., 196–197° C. (Cor.).

EXAMPLE 2

*Preparation of 5,5-diethyl-2,4-dithiobarbituric acid*

About 1200 cc. of commercial absolute ethyl alcohol was saturated with hydrogen sulphide by placing the alcohol in a two-liter container which was then evacuated until the alcohol boiled. Hydrogen sulphide was then added from a tank supply, and while the alcohol container was vigorously shaken by an automatic shaker, the pressure was allowed to rise to 7–8 pounds per square inch.

The alcohol solution of hydrogen sulphide and 10 grams of 5,5-diethyl-4-imino-2-thiobarbituric acid were sealed in a bomb and heated for 12 hours. Heat was applied by heating the bomb in an oil bath at 140–150° C. After the heating period, the bomb was cooled, opened, the solution filtered, and the alcohol and excess hydrogen sulphide evaporated off. The residue was dissolved in 50 cc. of water containing 1 gram of sodium hydroxide, and after filtering to remove the undissolved products, the sodium hydroxide solution was acidified with hydrochloric acid, and the resultant product accordingly precipitated. The precipitate was filtered off, and was then stirred with 500 cc. of dilute hydrochloric acid (10%) to remove any unreacted imino compound, filtered off again and washed well with water. The compound was crystallized from a mixture of ethyl alcohol and water using activated charcoal on the first crystallization. Subsequent crystallization was carried out until the compound reached a constant melting point. The resultant purified compound crystallized into deep yellow or orange-yellow rectangular platelets and was odorless. The yield was 5.1 grams (47.2%) after one crystallization and had a melting point of 210–210.5° C.

EXAMPLE 3

*Preparation of 5,5-ethyl, isopropyl-4-thiobarbituric acid*

Ten gm. of 5,5-ethyl, isopropyl-4-iminobarbituric acid were added to about 1200 cc. of commercial absolute alcohol saturated with hydrogen sulphide, as described with reference to Example 1. This mixture was sealed in the bomb and heated at 140–150° C. for twelve hours, as described in Example 1. The bomb was cooled, opened, the alcoholic solution filtered, and the alcohol and excess hydrogen sulphide were evaporated off under a hood. The yellow residue was dissolved in 300 cc. of water containing five gm. of sodium hydroxide, the insoluble material was filtered off, and the product was precipitated by acidification of the filtrate with hydrochloric acid. The precipitate was filtered off and then stirred with 10% hydrochloric acid to remove any unreacted imino compound. The undissolved product was filtered off and washed well with water. It was then crystallized from an alcohol-water mixture using activated charcoal until the melting point remained constant and the compound was odorless.

The compound crystallized in lemon-yellow needle crystals.

Yield, 3.3 gm. (30.4%) after two crystallizations; M. P., 192–193° C. (Cor.).

Analyses: Nitrogen (Kjeldahl); calculated, 13.08%; found, 12.96%, 12.88%.

EXAMPLE 4

*Preparation of 5,5-ethyl, isopropyl-2,4-dithiobarbituric acid*

About 1200 cc. of commercial absolute alcohol were saturated with hydrogen sulphide, as in Example 1. Ten gm. of 5,5-ethyl, isopropyl-4-imino-2-thiobarbituric acid were added to the hydrogen sulphide solution contained in the bomb, and the bomb was sealed and heated at 140–150° C. for twelve hours, as described in Example 1. At the end of the heating period, the bomb was cooled and opened. The yellow solution was filtered, the alcohol and excess hydrogen sulphide were evaporated off under the hood and the residue was stirred up with about 300 cc. of water containing five gm. of sodium hydroxide. The insoluble portion of the residue was filtered out, and the filtrate was acidified with hydrochloric acid to precipitate the product. The yellow precipitate was filtered off, stirred with about 200 cc. of 10% hydrochloric acid to remove the unreacted imino compound, filtered off again, and washed well with water. It was then crystallized from alcohol-water mixtures, using activated charcoal the first two crystallizations, until the melting point was constant and the compound was odorless. The compound crystallized in deep yellow or orange-yellow rectangular platelets.

Yield, 3.4 gm. (31.5%); M. P., 179.5–180.5° C. (Cor.).

Analyses: Nitrogen (Kjeldahl); calculated, 12.17%; found, 12.21%, 12.28%.

EXAMPLE 5

*Preparation of 5,5-ethyl, isoamyl-4-thiobarbituric acid*

About 1200 cc. of commercial absolute alcohol were saturated with hydrogen sulphide gas, as in Example 1. Ten gm. of 5,5-ethyl, isoamyl-4-iminobarbituric acid were added to the hydrogen sulphide solution and the mixture was sealed in the bomb, as in Example 1. The bomb was heated at 140–150° C. for twelve hours and then cooled and opened. The solution was filtered, and the alcohol and excess hydrogen sulphide were evaporated off under a hood. The yellow residue was dissolved in 300 cc. of water containing five gm. of sodium hydroxide. The basic solution was filtered free of undissolved material and the product was precipitated by acidification of the filtrate with hydrochloric acid. Instead of a granular, solid precipitate, as in the previous example, the product was a semi-solid, sticky, cohesive material.

EXAMPLE 6

*Preparation of 5,5-ethyl, isoamyl-2,4-dithiobarbituric acid*

About 1200 cc. of commercial absolute alcohol were saturated with hydrogen sulphide gas, as in Example 1. Ten gm. of 5, 5-ethyl, isoamyl-4-imino-2-thiobarbituric acid were added to the alcoholic solution of hydrogen sulphide, and the mixture was sealed in the bomb, and the bomb was heated for twelve hours at 140–150° C., as in Example 1. It was then cooled and opened, and the yellow alcoholic solution was filtered. The alcohol and excess hydrogen sulphide were evaporated off under the hood, and the yellow residue was dissolved in 300 cc. of water containing 5 gm. of sodium hydroxide. Some of the residue was not soluble in this basic solution so the solution was filtered, and the filtrate was acidified with hydrochloric acid which precipitated the product. The compound was filtered off, and was then stirred well with 200 cc. of 10% hydrochloric acid to remove any unreacted imino compound which may have been present. The product was then filtered off again and washed well with water. The compound was crystallized from water-alcohol mixtures, using activated charcoal on the first crystallization, until the melting point was constant and compound was odorless. The compound crystallized in deep yellow or orange-yellow rectangular platelets.

Yield, 3.9 gm. (36.45%) after three crystallizations; M. P., 161–162° C. (Cor.).

Analyses: Nitrogen (Kjeldahl); calculated: 10.84%; found: 10.96%, 10.71%.

EXAMPLE 7

*Preparation of 5,5-ethyl, n-butyl-4-thiobarbituric acid*

About 1200 cc. of commercial absolute alcohol were saturated with hydrogen sulphide gas, as in Example 1. Ten gm. of 5,5-ethyl, n-butyl-4-iminobarbituric acid were added to the alcoholic solution of hydrogen sulphide, the mixture was sealed in the bomb, and the bomb was heated at 140–150° C., as in Example 1, for twelve hours, then cooled and opened. The solution was filtered, the alcohol and excess hydrogen sulphide were evaporated off, and the residue which was left was dissolved in 300 cc. of water containing five gm. of sodium hydroxide. The basic solution was filtered free of undissolved material and the product was precipitated by acidification of the filtrate with hydrochloric acid. The product precipitated as a very sticky and cohesive semi-solid material. The material was removed from the water by collecting it on a stirring rod and was placed in a 10% solution of hydrochloric acid. This solution was then warmed slightly on a water bath until the product liquefied and was then stirred well to remove any unreacted imino compound. The mixture was then cooled in the refrigerator, and the product formed a semi-solid layer on top of the hydrochloric acid solution and was removed and dried. The product resembled very much the 5,5-ethyl, isoamyl-4-thiobarbituric acid described in Example 5.

EXAMPLE 8

*Preparation of 5,5-ethyl, n-butyl-2,4-dithiocarbituric acid*

About 1200 cc. of commercial absolute alcohol were saturated with hydrogen sulphide gas, as in Example 1. Ten gm. of 5,5-ethyl, n-butyl-4-imino-2-thiobarbituric acid were added to the alcoholic solution of hydrogen sulphide and the mixture was placed in the bomb and sealed, and the bomb was heated at 140–150° C. for twelve hours, then cooled and opened, as in Example 1. The yellow alcoholic solution was filtered and the alcohol and excess hydrogen sulphide were evaporated off under the hood. The yellow residue was dissolved in about 300 cc. of water containing five gm. of sodium hydroxide. The basic solution was filtered free of any undissolved material and the product was precipitated by acidifying the filtrate with hydrochloric acid. The precipitate was filtered off and then stirred up with about 200 cc. of 10% hydrochloric acid to remove any unreacted imino compound which might be present. The product was filtered off again and washed well with water. It was crystallized from alcohol-water mixtures, using activated charcoal the first time, until the melting point remained constant and the compound was odorless.

Yield, 6.1 gm. (56.75%); M. P., 130.5–131° C. (Cor.).

Analyses: Sulphur (Parr bomb); calculated, 26.24%; found, 26.29%.

By utilizing as the starting ingredient other 5,5-disubstituted-4-imino barbituric acid or other 5,5-disubstituted-4-imino-2-thiobarbituric acid, the corresponding 5,5-disubstituted-4-thiobarbituric acid and 5,5-disubstituted-2,4-dithiobarbituric acid (and their alkali or alkaline earth salts) may be produced. Thus in the 5,5-positions there may be ethyl and 1-methyl butyl; butyl and 2-methyl allyl; allyl and 1-methyl butyl; 1-methyl propyl and beta brom allyl or the 5,5-positions may be substituted with cyclohexenyl-1 and methyl and the 3 position substituted with methyl (viz. n-methyl-5,5-cyclohexenyl-1, methyl).

By utilizing the 5,5-disubstituted-4,6-di-iminobarbituric acid or the 5,5-disubstituted-4,6-di-imino-2-thiobarbituric acids (in which the 5,5 substituents may be of any of the substituents hereinbefore mentioned), there may be produced the corresponding 5,5-disubstituted-4,6-dithiobarbituric acid, or the 5,5-disubstituted, 2,4,6-dithiobarbituric acid, or the 5,5-disubstituted, 2,4,6-trithiobarbituric acid.

The 5,5-dialkyl-4-thiobarbituric acid and the 5,5-dialkyl-2,4-dithiobarbituric acid, prepared in accordance with the present invention, exhibit depressant or hypnotic action, having a rapid onset and relatively short duration of action, when pharmacologically tested, and are accordingly useful for producing such effects in the treatment and alleviation of human beings.

For most convenient administration, it is desirable to use a salt of the barbituric acid or thiobarbituric acid compounds of the present invention, particularly the alkali or alkaline earth salts, such as sodium, potassium, magnesium and calcium salts. In order to prepare such salts, the selected barbituric acid or thiobarbituric acid product of the present invention is reacted with a slight stoichiometric excess of the metal dissolved in absolute ethanol or methanol, and the reaction mixture is thereupon evaporated to dryness. The resultant alkali or alkaline earth salt, when dissolved in a suitable aqueous or non-aqueous media, is then utilized for therapeutic treatment.

The 5,5-disubstituted-4-imino barbituric acid used as a starting ingredient in some of the foregoing processes may be prepared by any suitable procedure such as that described in Conrad Annalen 340, 310 (1905), or Chamberlain, Chap, Doyle and Spaulding J. A. C. S. 57, 352 (1935). The 5,5-disubstituted-4-imino-2-thiobarbituric acid likewise used in some of the foregoing processes may be prepared by any suitable procedure, such as that described in Conrad, Annalen 340, 310 (1905).

The 5,5-disubstituted-4,6-di-imino barbituric acid and 5,5-disubstituted-4,6-di-imino-2-thiobarbituric acid used in certain other of the foregoing processes may be produced as follows:

Ethyl cyanoacetate is treated with ammonia to form ethyl cyanoacetamide which is dialkylated in two steps using an alkyl bromide wherein the alkyl of the bromide selected for the first alkylation is the one desired for one of the 5,5-positions and the alkyl of the bromide selected for the second alkylation is the one desired for the other of the 5,5-positions. As a result of the two-step alkylation there is produced di-alkyl-cyanoacetamide. This compound is treated with phosphorous pentoxide and as a result there is produced dialkyl malononitrile, which is condensed with urea or thiourea, according to the method of Conrad, cited above, to obtain either the 5,5-dialkyl-4,6-di-imino barbituric acid (when urea is used) or the 5,5-dialkyl-4,6-di-imino-2-thiobarbituric acid (when thiourea is used).

Many variations will be apparent to those skilled in the art and are deemed to be within the purview of the invention, illustrated, described and claimed.

What we claim is:

1. The process which comprises reacting a compound selected from the group consisting of the 5,5-di-substituted-4-imino barbituric acids, the 5,5-di-substituted-4-imino-2-thio-barbituric acids, 5,5-di-substituted-4,6-di-imino barbituric acid and 5,5-di-substituted-4,6-di-imino-2-thiobarbituric acid with hydrogen sulphide, and recovering the resultant compound.

2. The process which comprises reacting a compound selected from the group consisting of the 5,5-di-substituted-4-imino barbituric acids, 5,5-di-substituted-4-imino-2-thiobarbituric acids, 5,5-di-substituted-4,6-di-imino barbituric acid and 5,5-di-substituted-4,6-di-imino-2-thiobarbituric acid with a solution of hydrogen sulphide at an elevated temperature and superatmospheric pressure, and recovering the resultant compound.

3. The process which comprises reacting a compound selected from the group consisting of the 5,5-di-substituted-4-imino barbituric acids, 5,5-di-substituted-4-imino-2-thiobarbituric acids, 5,5-di-substituted-4,6-di-imino barbituric acid and 5,5-di-substituted-4,6-di-imino-2-thiobarbituric acid with a non-aqueous solvent solution of hydrogen sulphide at a temperature in excess of 120° C. in a sealed vessel, and recovering the resultant product.

4. The process which comprises reacting a compound selected from the group consisting of the 5,5-di-substituted-4-imino barbituric acids, 5,5-di-substituted-4-imino-2-thiobarbituric acids, 5,5-di-substituted-4,6-di-imino barbituric acid and 5,5-di-substituted-4,6-di-imino-2-thiobarbituric acid with hydrogen sulphide in ethyl alcohol at a temperature in excess of 120° C. and at superatmospheric pressure, and recovering the resultant product.

5. The process which comprises reacting a 5,5-di-substituted-4-imino barbituric acid compound with a stoichiometric excess of hydrogen sulphide in the presence of a solvent at superatmospheric pressure and at an elevated temperature and recovering the resultant 5,5-di-substituted-4-thiobarbituric acid compound.

6. The process which comprises reacting a 5,5-di-substituted-4-imino-2-thiobarbituric acid with a stoichiometric excess of hydrogen sulphide in the presence of a solvent, at superatmospheric pressure and at an elevated temperature, and recovering the resultant 5,5-di-substituted-2,4-dithiobarbituric acid compound.

7. The process which comprises reacting a 5,5-di-substituted-4,6-di-imino barbituric acid with a stoichiometric excess of hydrogen sulphide for each imino group present in the presence of a solvent, at superatmospheric pressure and at an elevated temperature, and recovering the resultant 5,5-di-substituted-4,6-di-thiobarbituric acid compound.

8. The process which comprises reacting a 5,5-di-substituted-4,6-di-imino-2-thiobarbituric acid with a stoichiometric excess of hydrogen sulphide for each imino group present in the presence of a solvent, at superatmospheric pressure and at an elevated temperature, and recovering the resultant 5,5-di-substituted-4,6-di-thiobarbituric acid compound.

9. The process 2 which comprises reacting a compound selected from the group consisting of 5,5-di-substituted-4-imino barbituric acids, the 5,5-di-substituted-4-imino-2-thiobarbituric acids, 5,5-di-substituted-4,6-di-imino barbituric acid and 5,5-di-substituted-4,6-di-imino-2-thiobarbituric acid with a stoichiometric excess of hydrogen sulphide for each imino group present in a solvent, in a sealed vessel at a temperature in excess of 120° C. and at a corresponding superatmospheric pressure, and separating the resulting corresponding 4-thio compound.

10. The process of claim 9 further characterized in that each of the 5,5-substituents is an alkyl of not more than 6 carbon atoms.

11. The process which comprises reacting a compound having the structure

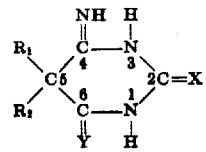

wherein X is selected from the group consisting of oxygen and sulphur, Y is selected from the group consisting of oxygen and imino, and $R_1$ and $R_2$ are selected from the group consisting of hydrogen, primary and iso alkyls having not more than 6 carbon atoms, primary and iso alkenyls having not more than 6 carbon atoms, aryl, cycloalkane, and cycloalkene group, with a stoichiometric excess of hydrogen sulphide for each imino group present in the presence of a solvent, said reaction being carried out at a temperature in excess of 120° C. at superatmospheric pressure, and recovering the thus formed corresponding 4-thio compound.

12. A new compound having the structure

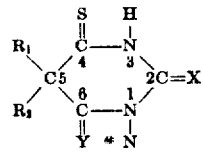

wherein X and Y are selected from the group consisting of oxygen and sulfur but are not both sulfur, and $R_1$ and $R_2$ are selected from the group consisting of hydrogen, primary and iso alkyls having not more than 6 carbon atoms, primary and iso alkenyls having not more than 6 carbon atoms, aryl, cycloalkane and cycloalkene group.

13. A new compound having the structure

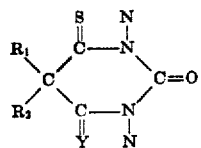

wherein Y is selected from the group consisting of oxygen and sulfur and R₁ and R₂ are selected from the group consisting of hydrogen, primary and iso alkyls having not more than 6 carbon atoms, primary and iso alkenyls having not more than 6 carbon atoms, aryl, cycloalkane and cycloalkene group.

14. A new compound having the structure

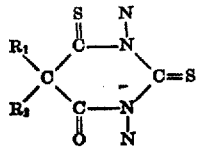

wherein R₁ and R₂ are selected from the group consisting of hydrogen, primary and iso alkyls having not more than 6 carbon atoms, primary and iso alkenyls having not more than 6 carbon atoms, aryl, cycloalkane and cycloalkene group.

15. A new compound comprising a 5,5-dialkyl-4-thiobarbituric acid wherein the alkyl is selected from the group consisting of primary alkyls and iso alkyls having not more than 6 carbon atoms.

16. A new compound comprising a 5,5-dialkyl-2,4-dithiobarbituric acid wherein the alkyl is selected from the group consisting of primary alkyls and iso alkyls having not more than 6 carbon atoms.

17. 5,5-ethyl, isoamyl 2,4-dithiobarbituric acid.
18. 5,5-ethyl, n-butyl 2,4-dithiobarbituric acid.
19. 5,5-ethyl, isopropyl 4-thiobarbituric acid.

CHARLES O. WILSON.
JAMES H. BOOTHE.

---

CERTIFICATE OF CORRECTION.

Patent No. 2,386,026.   October 2, 1945.

CHARLES O. WILSON, ET AL.

It is hereby certified that error appears in the printed specification of the above numbered patent requiring correction as follows: Page 3, second column, lines 46 and 47, Example 8, strike out "or the 5,5-disubstituted, 2,4,6-dithiobarbituric acid,"; and that the said Letters Patent should be read with this correction therein that the same may conform to the record of the case in the Patent Office.

Signed and sealed this 15th day of January, A. D. 1946.

Leslie Frazer (Seal)   First Assistant Commissioner of Patents.

and iso alkenyls having not more than 6 carbon atoms, aryl, cycloalkane and cycloalkene group.

13. A new compound having the structure

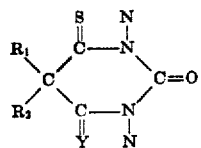

wherein Y is selected from the group consisting of oxygen and sulfur and $R_1$ and $R_2$ are selected from the group consisting of hydrogen, primary and iso alkyls having not more than 6 carbon atoms, primary and iso alkenyls having not more than 6 carbon atoms, aryl, cycloalkane and cycloalkene group.

14. A new compound having the structure

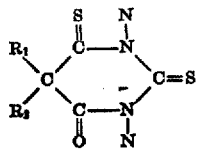

wherein $R_1$ and $R_2$ are selected from the group consisting of hydrogen, primary and iso alkyls having not more than 6 carbon atoms, primary and iso alkenyls having not more than 6 carbon atoms, aryl, cycloalkane and cycloalkene group.

15. A new compound comprising a 5,5-dialkyl-4-thiobarbituric acid wherein the alkyl is selected from the group consisting of primary alkyls and iso alkyls having not more than 6 carbon atoms.

16. A new compound comprising a 5,5-dialkyl-2,4-dithiobarbituric acid wherein the alkyl is selected from the group consisting of primary alkyls and iso alkyls having not more than 6 carbon atoms.

17. 5,5-ethyl, isoamyl 2,4-dithiobarbituric acid.
18. 5,5-ethyl, n-butyl 2,4-dithiobarbituric acid.
19. 5,5-ethyl, isopropyl 4-thiobarbituric acid.

CHARLES O. WILSON.
JAMES H. BOOTHE.

---

CERTIFICATE OF CORRECTION.

Patent No. 2,386,026.   October 2, 1945.

CHARLES O. WILSON, ET AL.

It is hereby certified that error appears in the printed specification of the above numbered patent requiring correction as follows: Page 3, second column, lines 46 and 47, Example 8, strike out "or the 5,5-disubstituted, 2,4,6-dithiobarbituric acid,"; and that the said Letters Patent should be read with this correction therein that the same may conform to the record of the case in the Patent Office.

Signed and sealed this 15th day of January, A. D. 1946.

Leslie Frazer (Seal)   First Assistant Commissioner of Patents.